United States Patent [19]
Reines

[11] 3,949,732
[45] Apr. 13, 1976

[54] SOLAR HEATED BUILDING

[76] Inventor: Robert G. Reines, Star Rte. 103, Tijeras, N. Mex. 87059

[22] Filed: June 10, 1974

[21] Appl. No.: 478,341

[52] U.S. Cl. ............... 126/270; 126/271; 237/1 A; 52/82
[51] Int. Cl.[2] ......................................... F24J 3/02
[58] Field of Search ................... 126/270, 271, 400; 237/1 A; 165/18; 52/82

[56] References Cited
UNITED STATES PATENTS

| | | | |
|---|---|---|---|
| 2,693,939 | 11/1954 | Marchant et al. ............... | 126/271 X |
| 2,713,252 | 7/1952 | Jackson et al. ...................... | 165/18 |
| 2,820,990 | 1/1958 | Johnson ............................. | 52/82 X |
| 2,907,318 | 10/1959 | Awot .................................. | 126/271 |
| 3,236,294 | 2/1966 | Thomason ....................... | 126/400 X |
| 3,244,186 | 4/1966 | Thomason et al. .............. | 126/270 X |
| 3,250,269 | 5/1966 | Sherock ............................. | 126/271 |
| 3,763,608 | 10/1973 | Chamlee ............................ | 52/82 X |
| 3,831,581 | 8/1974 | Baseley ............................. | 126/270 |

*Primary Examiner*—Kenneth W. Sprague
*Assistant Examiner*—James C. Yeung
*Attorney, Agent, or Firm*—Henry Heyman

[57] ABSTRACT

A solar heated building of generally hemispherical shape which supports on its surface solar heat collectors. The solar heat collectors are in the shape of spherical sectors and cover an arcuate area defined by the receipt of usable solar heat energy; consideration being given to the diurnal and seasonal positions of the sun. Heat collecting fluid is passed in thermal contact with the solar heat collectors and is in circulation with a heat storage reservoir. Air is passed in thermal contact with the solar heat collector to prevent overheating when the heat collecting fluid is cut off or to provide hot air when the heat storage reservoir is fully heated or when the solar heat collector is warmer than ambient but not hot enough to supply heat to the heat storage reservoir. The solar heat collectors are segregated by the heat collecting fluid circulation system piping into discrete arrays each covering about 15° of azimuth arc and each such array is controlled by one or more valves which admits or blocks heat collecting fluid flow. Each of the solar heat collector arrays and the heat reservoir is provided with a temperature sensor. A temperature comparison device compares the temperature of each of the solar collectors with the temperature of the heat reservoir to automatically open the valves to only such arrays as will supply heat to the heat reservoir. The air circulation system through the solar heat collectors is automatically activated for cooling when the solar heat collectors are not being used for heat storage. When air is passed through the solar heat panels, the heated air may be used to directly provide hot air for space conditioning or other purposes and thereby conserve the stored heat. The dual-mode capability of air-fluid operation enables the system to extract the maximum amount of solar energy for usable purposes.

17 Claims, 12 Drawing Figures

SECTION B-B

SECTION A-A

SECTION B-B

SECTION C-C

SOLAR HEATED BUILDING

SUMMARY OF THE INVENTION

This invention relates to a solar energy heated building of dome or hemispherical shape, which shape is particularly advantageous for the utilization of an arcuate arrangement of vertical sectors of the exterior wall for the collection and conversion to heat of solar energy. The vertical cross-sectional shape of such dome shaped buildings is advantageous in the collection of solar heat regardless of the difference in elevation of the sun due to seasonal effects and geographical latitude of installation.

The horizontal circular shape enables the sun to be tracked on a daily basis. Only that portion of each sector is utilized as a solar heat collector which has an angle of exposure to the sun adequate to provide effective collection of solar energy. Thus the solar heat collectors are actually frusto-sector shaped. Heat conducting fluid is gated on to only those solar heat collectors which collect heat from the sun rapidly enough to contribute heat to a heat reservoir. Automatic means are provided to air cool such solar heat collectors as are not being supplied with fluid for heating the reservoir if the temperature of the solar heat collector approaches a damaging level.

The dome shaped building is preferably fabricated from vertical sectors each of which has a rectangular rib extending along the vertical median line and which together with interlocked adjacent sectors shares a like rectangular rib on each of its vertical edges with the said adjacent sectors.

The solar heat collecting panels are fabricated directly on the dome shell sectors by applying black paint between the ribs and supporting at least one transparent cover on the ribs. The preferred number of superposed transparent covers are two which are substantially hermetically sealed to each frusto sector by firm but slidable fastening means. The fastening means admits of limited slidability between the transparent sheets and the sector ribs to allow for differences in thermal coefficients of expansion therebetween.

The solar heat collecting panels are arranged to receive a film or thin sheet of water at the top from controlled valves and to drain at the bottom by gravity into a common manifold which connects with a heat reservoir. Thus the solar heat collecting panels are always drained when not in use whereby "freezing" problems are eliminated. Tracking of the sun is accomplished by sensing the temperature of the panels and the temperature of the heat reservoir and valving heat conductive fluid into those panels hot enough to supply heat to the heat reservoir. The valves may be controlled by a clock mechanism but the temperature sensing method of the present invention is preferred because it has the important advantage of most effective use of the solar heat collecting panels for the maximum collection of solar energy. For example, if the temperature of the heat reservoir is low, a substantial plurality of solar heat collecting panels will be activated. As the temperature of the reservoir rises, only those solar heat collecting panels having adequate temperature remain activated.

The preferred type of solar heat collecting panel is of the type above described; that is, the dome shell sectors, if made of metal are directly used as the radiation receiving surface. However, the advantages of the dome shape such as, for tracking, reducing length of piping, reducing the amount of insulation needed for piping, etc., are such that if the dome shaped building is already constructed or is made of non-conducting materials such as concrete or composition, the solar heat collecting panels of the present invention can be affixed to the exterior surface of the building with few, if any, other changes.

Another aspect of the present invention is provision for controlled ventilation. The usual dwelling structure has enough leakage of air between indoors and outdoors to provide adequate oxygen for life support. The building of the present invention is essentially non-leaky so that provision is made for a fail-safe, controlled system for proper ventilation.

The heat accumulator utilized in the present invention is of the volume water type housed in an insulated heat storage reservoir and preferably is connected directly to space heaters without the intervention of a heat exchanger. For other hot water purposes, a heat exchanger is used to eliminate the drain on the soft water supply needed for the solar heat collectors.

The solar heat collecting structure is applicable as the source of heat for conventional type buildings. A dome shaped or inclined faceted structure is mounted proximate and preferably on top of the conventional type building in order to facilitate the liquid plumbing and air ducting systems. Additionally, the automatic sun tracking solar heater of the present invention can be installed on top an insulated water tank to supply hot water for a community.

DETAILED DESCRIPTION OF THE INVENTION

Other features, objects and advantages of the invention will become apparent from reading the following detailed description of the invention with reference to the accompanying drawing which shows by way of illustration and not limitation, a building utilizing the invention.

Figure 1:
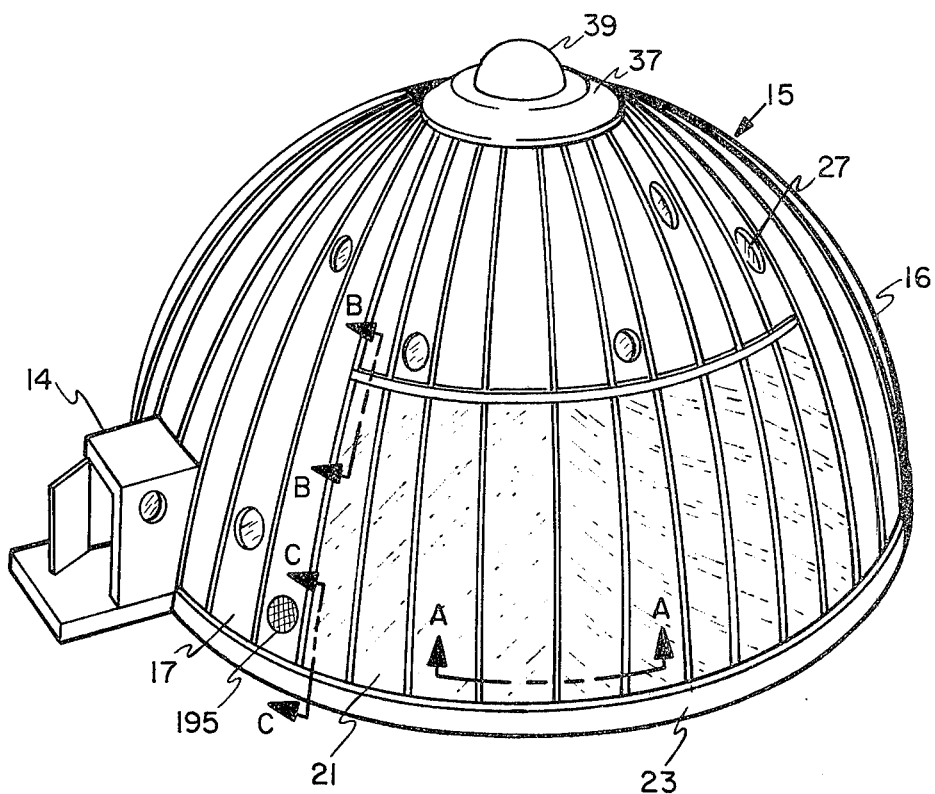
FIG. 1 is a side perspective view of one embodiment of a dwelling in accordance with the invention.
Figure 2:
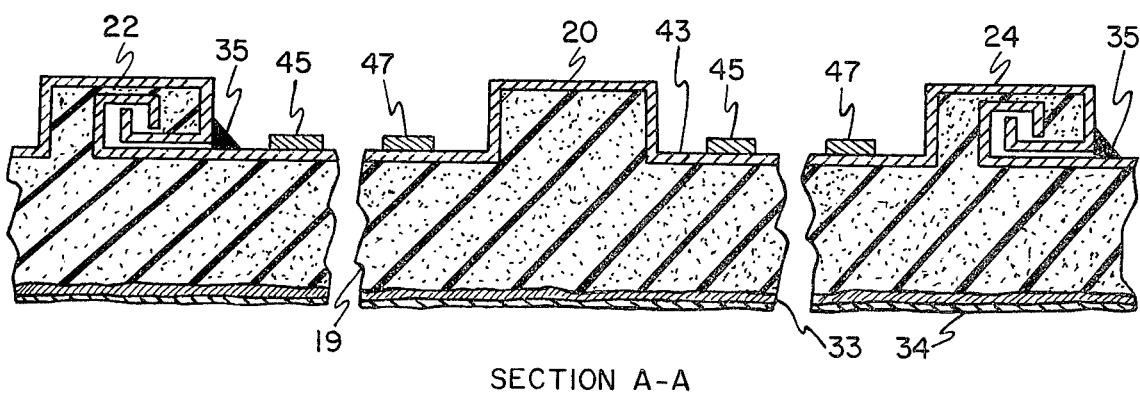
FIG. 2 is a foreshortened horizontal cross section taken along section A—A of FIG. 1 to show the shell sectors, the joints between them and the solar heat collecting panel.
Figure 4:
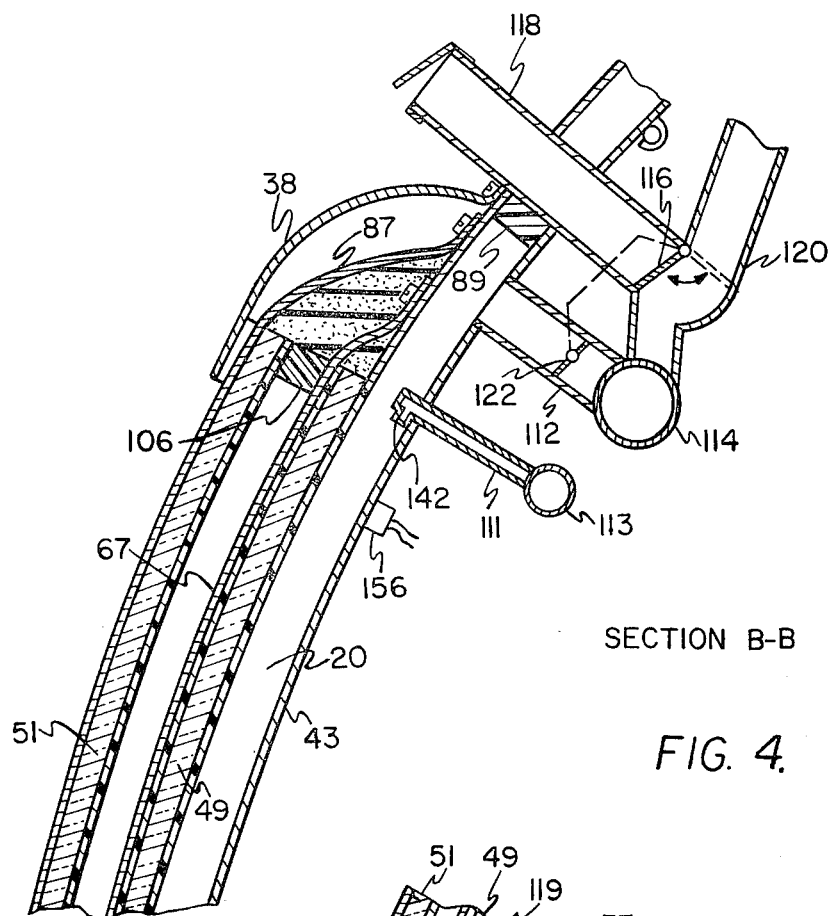
FIG. 4 is a vertical diametric cross section of a wall portion at the upper end of the heat panels to show heat panel and ducting details taken on section B—B of FIG. 1.
Figure 3:
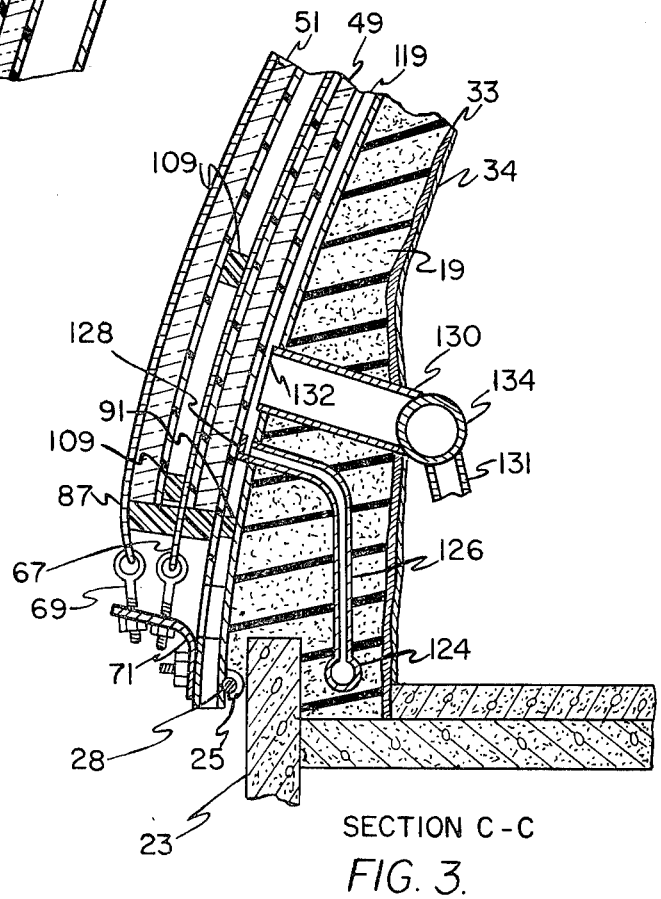
FIG. 3 is a vertical diametric cross section of a lower wall portion to show construction, and solar heat collecting panel details taken on section C—C of FIG. 1.

The dome shaped building 15 is shown in FIG. 1, with portions shown in FIGS. 2, 3 and 4, includes an outer hemispherical shell 16 constructed of interlocking sector panels 17 to which is attached an inner wall of insulation 19. Each sector panel has on both its elongated edges a reentrant channel for interlocking with adjacent sector panels. Each sector panel also has an outwardly projecting middle rectangular reinforcing rib 20 along its vertical median line. Each of the sector panel vertical edge reentrant channels when assembled to adjacent sector panels provide outwardly projecting rectangular ribs 22 and 24 similar in configuration to the middle rectangular rib 20.

Shell sector panels along an arc profitably exposed to the sun, such as on the southeastern and south exposures of the building are utilized as the heat collecting members for solar heat collectors 21.

The assembled shell rests on and is anchored to a foundation or footing 23 of any suitable material such as concrete. One practical method for securing the shell to the foundation utilizes bolt-hooks 25 shown in FIG. 3 which engage an annular metal ring 28. Ring 28 is constricted by a turnbuckle or the like (not shown) against the outer surface of footing 23.

The top end of the frusto-sector panel portions utilized as an element of the heat collecting panels is sealed by a hood or upper end closure plate 38 shown in FIG. 4.

For thermal insulation, three or four inches of in situ applied insulation foam 19 is attached to the inside surface of the building shell. An economical, safe and very effective insulation is sprayed and hardened foaming material upon which is applied an inner coating 33 of fire preventive material. A layer of reflecting material like aluminum foil 34 may be used to enhance the insulation effect. The presence of a thick interior wall of insulation adhered to the metal shell requires that the construction of the shell accommodate for the difference in the temperature coefficient between the metal panels and the mass of insulation. Further, different shell panels expand different amounts in that those having a surface at anytime normal to the direction of the sun are heated most and expand most with the amount of expansion in adjacent panels decreasing as the rays of the sun become more oblique to their spherical surface planes. As the position of the sun changes relative to the panels the relative expansion of the panels tracks the sun. The sector panels on that side of the building not exposed to the sun expand or contract in response to the changes in ambient temperature alone.

To the end that the disproportionate expansion and contraction of the exterior shell sectors relative to the wall of insulation will not cause buckling of the shell or detachment between the shell sector panels and the insulation, the engagement between adjacent panel sectors must be slidable to a compensating degree. Referring to FIG. 2, the vertical reentrant sector edge configurations of a suitable commercially available type are shown in detail. It is not necessary that this specific edge configuration be used provided a joint between panels is obtained which prevents radial movement while allowing for some circumferential slippage and at the same time produces a rectangular rib configuration capable of hermetic sealing as by a fillet of flexible caulk 35.

Proximate the top of the dome, a ventilating cap 39 is affixed.

Figure 5:
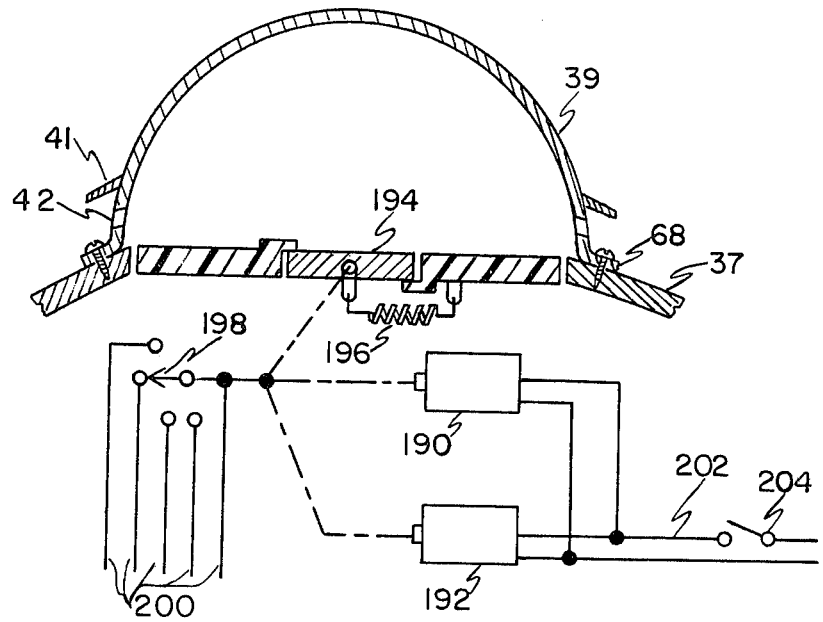
FIG. 5 is a vertical diametric cross section of the central part of the roof, ventilation cap and ventilation structure details.

A rain shield 41 is affixed to the outer surface of the ventilating cap 39 thereby providing with ventilating cap apertures 42, passages for ventilating air, as shown in FIG. 5.

Figure 6:
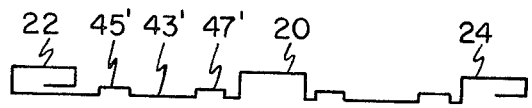
FIG. 6 shows a horizontal cross section of a modified form of solar heat collecting panel.
Figure 7:
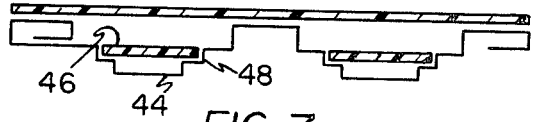
FIG. 7 is a horizontal cross section of another modification of solar heat collecting panel construction.
Figure 8:
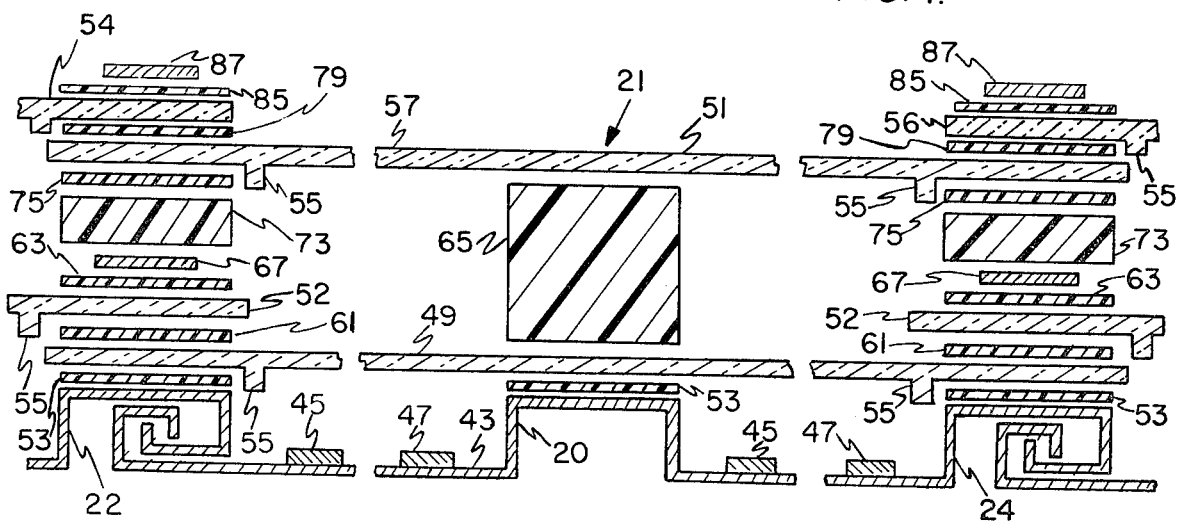
FIG. 8 is a horizontal cross section of a solar heat collecting panel with certain details disproportionately enlarged for clarity.

Solar energy collecting panels 21 are shown in cross section in FIGS. 3, 4 and 8. The heat collecting fluid flows downward over the surface of panel 43. Panel 43 differs from non-heat collecting panels in that its outer surface is coated with black heat absorbing paint. The amount of fluid passed over the panel surface is limited by the fluid temperature desired and the rate of heat collection by the panel. The fluid, if liquid, is generally a very thin sheet if it covers the entire width of the heat panel. With such a very thin sheet of fluid, it is very difficult to prevent channeling; that is, the fluid tends to convert from a sheet to riverlets which have inadequate thermal coupling with the surface of the panel. To the end that the stream of fluid be a continuous sheet of adequate width to give good thermal coupling with the panel, vertical confining and guiding dams 45 and 47 are affixed to the surface of the panel. Each water confining channel can be delineated by various means, and alternatives are shown in FIGS. 6 and 7. The dams shown in FIG. 8 may be plastic material magnetic strips of a type commercially available.

Referring to FIG. 6, the fixed channel dams shown in FIG. 6 are upwardly upset ribs 45' and 47' in the solar heat collecting panel.

FIG. 7 shows another solar heat collecting panel in which a trough 44 of selected widths is formed by a depression in the solar heat collecting panel. In this configuration a first transparent cover 46 is supported on and sealed in recesses 48 provided in the panel.

Referring again to FIG. 8, the solar energy collecting panels are covered with two transparent sheets 49 and 51. Such materials have a high temperature coefficient of expansion compared with the metal heat absorbing panels. To the end that the transparent sheets can differentially expand and contract, the sheets are firmly, but slidably mounted on the heat collecting panel ribs. Sheet 49 rests on non-sticking gasket strips 53 which in turn rests on and are affixed to panel ribs 20, 22 and 24. All the transparent sheets are provided with projecting sidewise locating tabs 55.

Adjacent heat panel transparent sheets 52 overlap the edges of sheet 49. In the overlapping areas, non-sticking gaskets 61 are provided between the sheets to permit relative shifting. Over the top surface of transparent sheets 52 in the overlap zone with sheet 49, another set 63 of non-sticking gaskets are provided.

Each edge of the first or inner layer of transparent sheets is held in place and hermetically urged together and to the panel ribs by tensioned metal strips or bands 67 shown in FIG. 3. Bands 67 are anchored to the panel ribs 22 and 24 at the top end as shown in FIG. 4. At the bottom end, the bands 67 are connected to a tensioning bolt-eye 69. Bold-eye 69 threads bracket 71 which in turn is secured to base bolt 25. Bands 67 are drawn tight enough to provide adequate radial pressure between the transparent sheets, gaskets and rib tops.

The second assembly of transparent sheets 51, 54 and 56 is made in a manner similar to the first assembly. Spacer blocks 73 are set in place over tensioning bands 67 over ribs 22 and 24. A thicker spacer block or strip 65 is set over transparent sheet 49 over rib 20. On top of blocks 73, non-sticking gaskets 75 are set in place. Transparent sheet 51 is installed in contact with gaskets 75 and spacer blocks 73 and 65. Non-sticking gaskets 79 are set over the edge zones of transparent sheet 51. Next, transparent sheets 54 and 56 are set in place. Non-sticking gaskets 85 are placed over the edge zones of transparent sheets 54, 56 and tensioning bands 87 are installed in a manner similar to tensioning bands 67. At the top and bottom of each solar heat collector panel as shown in FIGS. 3 and 4, filler blocks 89 and 91 respectively are affixed to the collector panel 43 between the ribs to seal the ends thereof. Cross blocks 109 are placed between the transparent panels transversely of the lengthwise direction of the solar heat collector panels to prevent warpage of the plastic material.

As stated, supra, each solar heat collector panel is constructed to heat a heat conducting fluid which is liquid and/or air. Referring to FIG. 4, the upper end of each heat panel 43 (shown without the inside insulation), between each pair of ribs, is provided with an inlet fluid pipe 111 and an outlet air duct 112. The inlet fluid pipe is connected to a manifold 113 which is common to a plurality of solar heat collector panels as is more clearly seen in FIG. 9. The air duct 112 is provided with a gate 122 and is connected to a plenum 114 and a three-way valve 116. The three-way valve communicates with a duct 118 which is ported to the outside and a duct 120 which may be connected to household accessories such as clothes dryers, or to a room register for direct space heating. Temperature sensing means 156 on the solar heat collecting panels automatically opens gate 122 when a heat collecting panel exceeds a selected upper limit of temperature.

Gate 122 is normally closed in order to block the air passage when the solar heat collector panel is utilized to heat the heat transport liquid. The flexibility of the arrangement allows gate 122 to be partially opened while heat transport liquid is flowing to generate moist environmental air when needed for the interior of the building. In addition, gate 122 may be opened and gate 116 closed to the outside for heating the interior when heat transport liquid is not flowing. This means of heating results in the ability to use those heat panels which are not hot enough to supply heat to the heat storage reservoir but are hot enough to directly provide usable hot air for space heating or other purposes.

Referring to FIG. 3, hot heat transport liquid collection manifold 124 communicates with the solar heat collector via pipe 126. The hot liquid traveling down the solar heat collector panel 43 encounters dam 128 and is diverted to exit pipe 126. An inlet air duct 130 communicates with the space between the heat collector panel ribs and is provided with a projecting lip 132 which prevents the ingress of liquid into the air duct. Air duct 130 is connected to a common manifold 134 which in turn is coupled via pipe 131 to the interior of the building or to the exterior to preheat fresh air.

Figure 9:
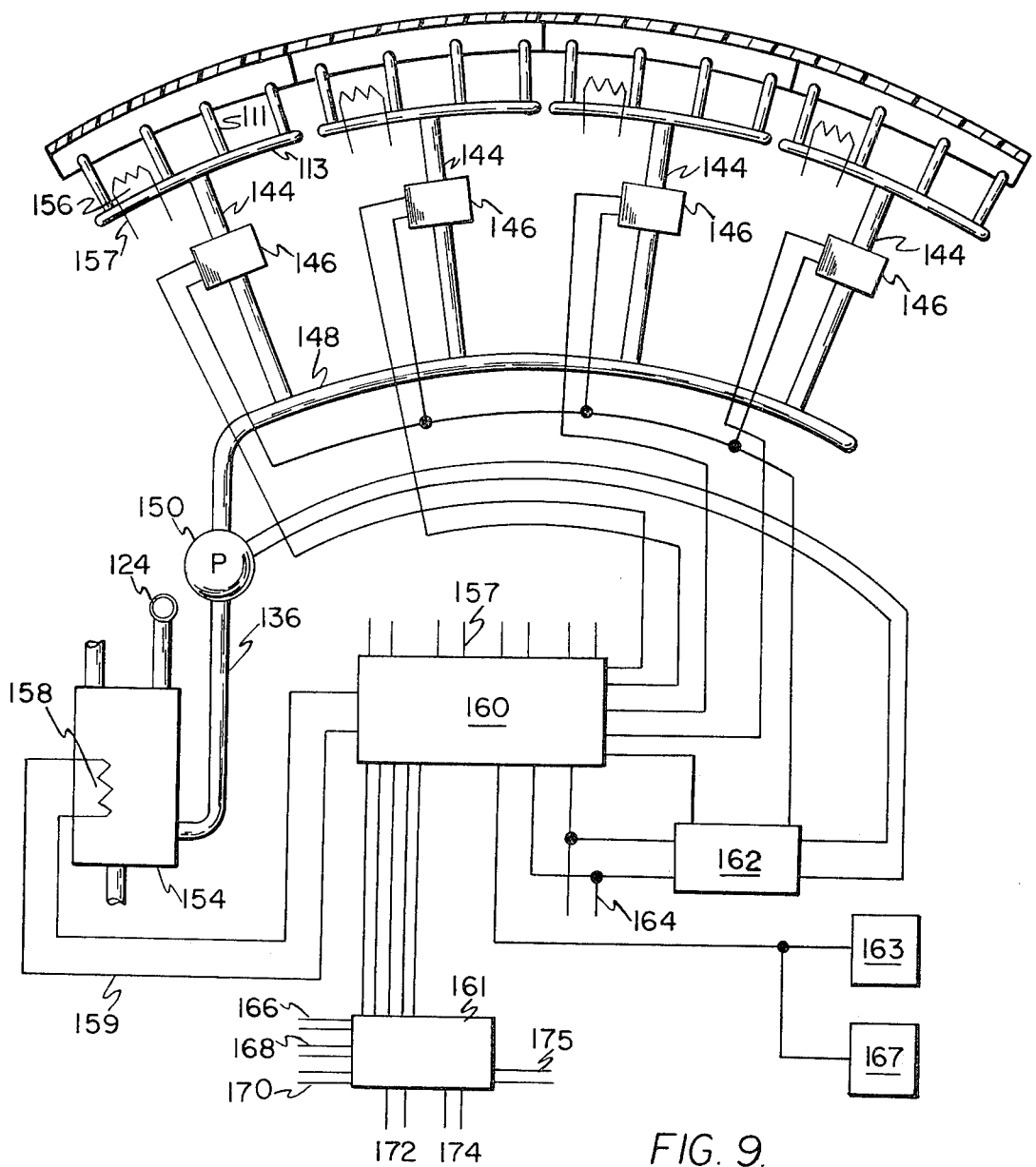
FIG. 9 is a schematic drawing of solar heat collecting panel tracking details.

The heat transport liquid is conveyed from heat storage reservoir 154 shown in FIG. 9 through a pump 150 and pipe 136 to electrically operated valves 146 which in turn are connected by pipes 144 to manifolds 113. It has been found that approximately 15° of arc of heat panels supplied with heat collecting fluid through one controlled manifold allows for effective sun tracking. Accordingly one tube 111 with one or more orifices communicates with the top portion of each solar heat collecting panel liquid channel shown diagrammatically in FIG. 9. For example, the solar heat collecting panel of FIGS. 2 and 6 has vertical dams 45 and 47 shown as one pair to provide one liquid channel but it may be desirable to provide additional dams to control liquid flow to collect heat more efficiently. The number of heat collecting panels to be coupled to an inlet valve for 15° sun tracking in a building 30 feet 6 inches in diameter, and where each heat collecting panel is 1 foot wide at the base is four in number. The total spherical arc encompassed by all the heat panels is largely determinable from empirical data relating to the geographical environment in which the building is located. For purposes of illustration, FIG. 9 shows piping for a total arc of heat collecting panels of 60°. The fluid orifices of each four adjacent one foot wide panels are connected to common manifold 113 also shown in FIG. 4. Heat reservoir 154 is as large a tank as is economically feasible. It is thoroughly insulated against losses to the atmosphere if above ground or losses to the earth if buried in the ground. A reservoir of approximately 3000 gallons if heated to approximately 130° F is considered adequate for at least 10 days' supply of household heat at 0° F exterior temperature. The dual mode capability of direct air heating significantly increases the effective heat storage capacity of the storage reservoir. In climates of consistently ample sunlight during the entire year, a smaller reservoir heat accumulator is adequate. In climates of sustained cloudiness, a larger reservoir is desirable. It is apparent that the solar heat collecting panels can function as a source of heat for the reservoir only when the heat collecting panels are hotter than the liquid (water) in the reservoir. To the end that the solar heat collecting panels will be activated only when they can supply heat to the reservoir, a temperature sensing device 156, such as a thermistor is attached to at least one solar heat collecting panel in each array. A similar temperature sensing device 158 is in thermal contact with the liquid in the heat storage reservoir 154. The solar heat collecting panel temperature sensing device 156 in each solar heat collecting panel array, and the temperature sensing device 158 in the reservoir are electrically connected through leads 157 and 159, respectively, to electronic temperature comparitor 160 using circuitry well known in the art. Comparitor 160 automatically generates energizing current for opening valves 146 in one or more solar heat collecting arrays at some selected temperature differential hotter than the reservoir. All other array supply valves 146 remain closed. The solar heat collecting panel liquid supply pump 150 is energized by current responsive relay 162 whenever any one or more of valves 146 are activated by temperature comparitor 160. The electrical current for both valves 146, pump 150 and any other electrically associated devices is supplied from any available source whether commercial or in situ generated when connected to electrical connections 164.

The use of the temperature comparison system of the present invention rather than any other type solar tracking method has several important advantages. The ability of the temperature comparitor to energize as many solar heat collecting panels as are capable of supplying heat to the reservoir results in the most effective use of the solar heat collecting panels for the most rapid possible replacement of heat in the reservoir. In addition, the temperature comparitor method is completely automatic regardless of seasonal variations in the position of the sun, whereas other methods require frequent resetting.

Figure 10:
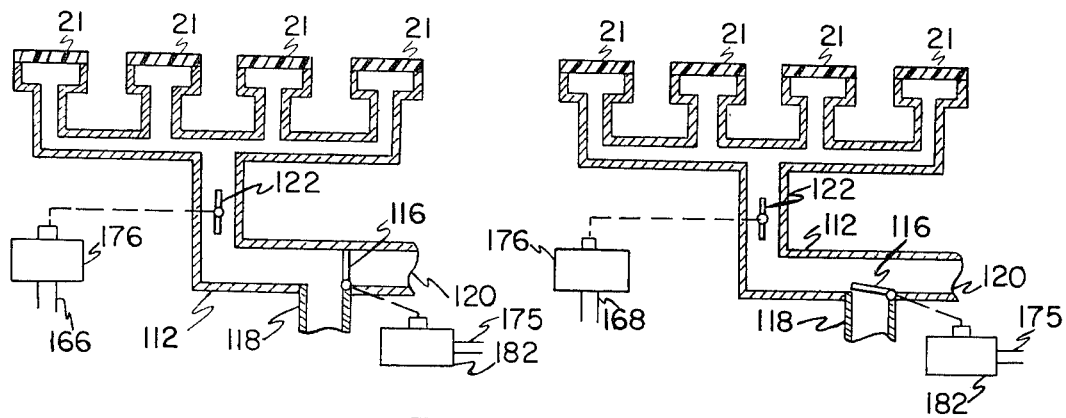
FIG. 10 is a diagrammatic drawing of an air flow system showing solar heat collecting panel protective and hot air generating details.

The temperature comparitor 160 is also arranged to deactivate all fluid control valves 146 when the water temperature in the heat accumulating reservoir reaches the upper selected temperature limit. In addition, when heat transport liquid is cut off from any solar heat collecting panels, and the temperature of such panels starts to exceed a safe upper limit, signals responsive to the solar heat collecting panel temperature responsive devices 156 activate relay switches 161 through respective electrical leads 166–174. Referring to FIG. 10, any such signal activates motor control 176 to move duct gates 122 to a position to admit an air flow through the corresponding solar heat collecting panel to prevent overheating. Gate 123 is operable to divert the hot air into duct 118 for interior space purposes or into duct 120 for exterior dumping.

The dual mode heat transport liquid heating and air heating of the solar heat collectors of the instant invention provides the flexibility for humidifying the interior space air. A humidity sensor 163 coupled into temperature comparitor 160 results in the activation of a water control valve 146 in a panel or panels utilized for hot air supply. In addition, any solar heat collector panels too cool to supply heat to the reservoir, but hot enough to warm the interior of the building is activated in response to room temperature sensor 167 to supply warm air or preheated fresh air. Room humidity responsive device 163 provides a signal to the comparitor for allowing liquid flow in the hot air producing solar heat panels for humidity control.

A part of the present invention is provision for controlled ventilation. The amount of heat available for warming the building, particularly if used as a dwelling, is limited by the average solar heat available over a number of days. Consequently, it is necessary that the building be competently insulated and that adequate but not excessive air exchange with the outside be provided. In the usual prior art building construction, adequate ventilation was provided by leakage through closures such as doors and windows and to some extent through walls and roof. In a building constructed in accordance with the present invention, the windows are sealed in the walls and care is taken with the doors or other closures to obtain a substantially leakless fit. Consequently, the ventilation must be subject to positive fail-safe control. A minimum of two automatic environmental-responsive controls are needed. Referring to FIG. 5, one control 190 is responsive to oxygen content in the air, and control 192 is responsive to contaminants in the air. Gate 194 within ventilation cap 39 is biassed in a fail-safe direction by spring 196; that is, in the event of failure of the environmental responsive controls, gate 194 is fully opened. Normally, gate 194 will be open to an extent dictated by the amount of oxygen in the building, or by the amount of carbon dioxide. Air is exhausted at the dome of the building and is admitted from the outside by one or more air ventilators 195 (shown in FIG. 1) communicating through the wall of the building near the floor or by admitting preheated air from ducts 130 and 131. A plurality of such ventilators and, if desired, motor driven fans are utilized. One ventilator is continuously open. In the event the demand for fresh air exceeds the amount furnished by the one ventilator, additional ventilators are opened or motor activated through switch 198 and leads 200 to an extent corresponding to the amount of opening of gate 194. It is within the purview of this invention to provide additional environmental air exchange controls depending on the usage to which a building is put. Activities within a dwelling may occasionally involve the use of cements or paints which emit harmful solvents into the air. Additional air may be consciously admitted at such times by cutting off the power to controls 190 and 192 by opening manual switch 204 in power leads 202. The opening of switch 204 will allow spring 196 to open gate 194 to maximum position and to turn on all ventilators. In buildings, such as plastic molding plants, additional environmental air responsive controls sensitive to such vapors may be used in addition to basic controls 109 and 192.

The solar heat collection system of the present invention is most effective in a building basically designed for its use. However, the arcuate geometry of a plurality of solar heat collecting arrays used with temperature sensors is applicable as an improved solar heat conversion system for conventional type buildings or any application to which solar heating is desirable.

Figure 11:
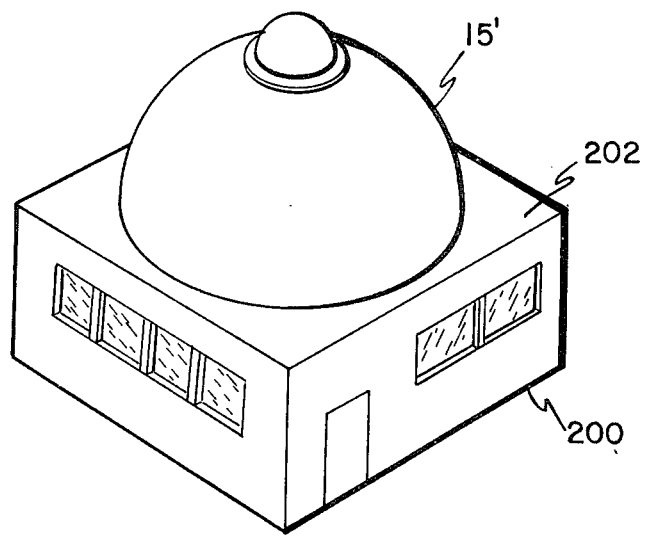
FIG. 11 is a solar heat collection system of the presented invention as associated with a generally conventional type building.

Referring to FIG. 11, a solar heat collection system 15' of the present invention is associated with a generally conventional type building 200. The dome shaped solar heat collector is supported on roof 202. The details of heat transport liquid piping, valving and automatic controls are arranged to conduct the heated liquid or air into building 200 by extended piping and duct work. Such modifications require only the skills available in the art. The advantages of the efficient dual mode heat collection system with automatic sun tracking is thus applicable as a convenient and economical adjunct to conventional types of building design.

Figure 12:
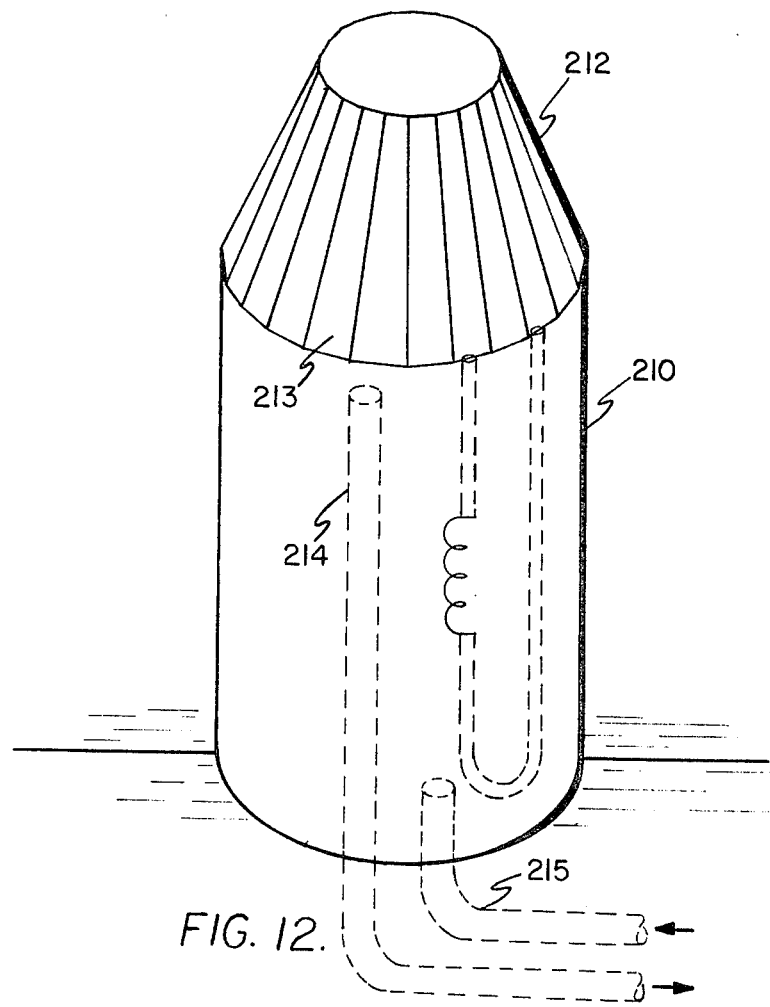
FIG. 12 is a solar heat collection system in accordance with the present invention but of polygonal form as applied to a hot water storage tank.

Referring to FIG. 12, a solar heat collection system in accordance with the present invention but of polygonal form is applied to a hot water storage tank 210. While dome shaped building is the most efficient form of construction for an integral solar heating system and building, a multi-faceted solar heat collection structure may be preferred in some cases. FIG. 12 shows a solar heat collection system 212 in the form of a multi-sided truncated pyramid. Building 212 is preferably constructed with 24 facets, thereby permitting 15° tracking increments. If desired, the solar heat collection system of multi-facet design could, if desired, be a divided off portion of a spire. The details of solar radiation transferance to heat and the utilization thereof are similar to those described for the dome shape solar heat collection system. Each facet 213 is a solar heat collector in accordance with the present invention except that the dual mode hot air system is used only to cool solar heat collection panels to prevent overtemperature damage. The tank 210 and hot water outlet pipe 214 are suitably insulated to prevent cooling of the water while stored or transported to points of utilization.

Thus far in the description, advantage has been taken of the radiant heat absorbing nature of the domed metal shell to utilize portions of the metal shell as the solar heat collecting panels. It is also contemplated that buildings having the advantageous domed shape may be constructed of other materials than metal. In such case, the present invention contemplates the use of arrays of curved solar heating panels fastened to the exterior surface of such buildings. All the remaining aspects of the illustrative embodiments described, supra, remain substantially unchanged.

What is claimed is:

1. A solar heated building comprising in combination: a substantially hemispherical outer wall; a plurality of adjacent frusto-sector shaped solar heat collectors supported on said outer wall and extending both in azimuth and in vertical spherical angle with directions of useful receipt of solar energy including diurnal and seasonal variations in such directions; said solar heat collectors each having a solar heat collecting sheet; means for circulating a heat transport fluid in thermal contact with the solar heat collecting sheet; at least one transparent covering sheet supported in spaced covering relation over each solar heat collecting sheet; said plurality of frusto-sector shaped heat collectors being separated into discrete arrays; a heat transport fluid distributing manifold connected to the top end of each of the solar heat collecting sheets in each array; a heat transport fluid collecting manifold connected to the bottom ends of all the solar heat collecting sheets; a controllable valve connected in series with the input of each of the heat transport fluid distributing manifolds; a heat transport fluid storage reservoir; piping means connecting the heat transport fluid reservoir to a circulating pump; piping means connecting the circulating pump to the controllable valves; piping means connecting the storage reservoir to the heat transport fluid collecting manifold; a temperature responsive device connected in thermal contact with at least one solar heat collecting sheet in each array; a temperature responsive device connected in thermal contact with the heat storage reservoir; and means responsive to a positive difference between the temperature of the solar heat collecting sheets and the temperature of the heat storage reservoir to open the controllable valves of all those arrays which are hot enough to contribute heat to the heat storage reservoir; whereby the number of heat contributing arrays is a maximum when the temperature of the heat storage reservoir is depleted and tracking of the sun is automatic.

2. The solar heated building of claim 1, in which the building outer wall is a metal shell fabricated with vertical spherical sectors; each of the sectors having a rectangular rib on each vertical edge shared with the adjacent vertical spherical sector; means securing said vertical spherical sectors in adjacent relationship in a circumferential sliding joint to accommodate lateral expansion due to temperature changes; an inner wall of heat insulating material affixed to the interior surface of the assembled metal shell.

3. The solar heated building of claim 2 in which a transparent cover is slidably supported on the vertical outstanding ribs of solar heat collecting vertical metal sectors; means affixed to the underside of the transparent cover proximate the edge of the outstanding ribs to allow limited movement of the transparent sheet due to thermal expansion and contraction while maintaining the position of the transparent sheet as a whole in fixed relation with the ribs on the vertical metal sectors.

4. The solar heated building of claim 3 in which the transparent covers over adjacent solar heat collecting sheets overlap lateral edge portions of each other over the sector ribs, gaskets interposed between said transparent covers and the top surfaces of the vertical metal sector ribs; means for substantially hermetically sealing the space between the upper and lower ends of the transparent covers and the vertical metal sectors between the rectangular outstanding ribs; and means for impressing an inward radial pressure on the edge portions of the transparent sheets relative to the vertical metal sectors to substantially hermetically seal the edge portions of the transparent sheets to each other and to the top surfaces of the rectangular outstanding ribs of the vertical metal sectors.

5. The solar heated building of claim 4 in which the means for impressing an inward radial pressure on the edge portions of the transparent sheets is an arcuate pressure member bearing against the edge portions of the transparent sheets; means for affixing the pressure member to the vertical metal sectors above and below the transparent sheets and means for applying a tensioning force to the arcuate pressure members whereby an inward radially directed pressure is applied to the transparent sheet edge portions.

6. The solar heated building of claim 5 in which an exit air duct is connected to the top of the solar heat collectors in each array above the heat transport fluid distributing manifold connection; an inlet air duct connected to the bottom of each of the solar heat collectors below the heat transport fluid collecting manifold connection to admit the vertical passage of air through said inlet duct, the space between the transparent cover and the solar heat collecting sheet, and out through the exit air duct.

7. The solar heated building of claim 6 in which gating means is supported in one of the air ducts to close off the passage of air when heat transport liquid is being heated and to admit air in contact with the solar heat collecting sheet for cooling the solar heat collecting sheet and to supply heated air for utilization purposes.

8. The solar heated building of claim 7 in which motor means is connected to said gate, means responsive to excessive temperature of any solar heat collecting sheet in any array for energizing said motor means for opening said gate.

9. The solar heated building of claim 7 in which the gating means is a movable gate in an air duct connected to each heat collecting panel, motor means for moving said gate, means responsive to an off condition of a heat transport fluid valve and to a room temperature demand signal for energizing said motor means for opening said gate for supplying heated air for space heating purposes.

10. The solar heated building of claim 9 in which a humidity responsive device provides a signal for controllably opening the heat transport fluid valve while the gate is open, whereby the air is passed over the solar heat collecting plate in contact with moisture to provide heated humidified air for interior space heating.

11. The solar heated building of claim 7 in which a ventilating cap is supported on a top portion of the building and connected through a controllable valve with the interior of the building; means responsive to oxygen content and contaminants in the air in the building for adjusting the opening in said controllable valve.

12. The solar heat building of claim 11 in which means responsive to the temperature in the building opens exterior air vents when the temperature is adequate, and opens the heated air duct into the interior of the building for supplying warm air when the interior temperature is lower than desired.

13. A solar heat collecting panel comprising a solar heat absorbing sheet having a front and a back side, a thick insulation blanket affixed directly on the back side, a transparent cover affixed in spaced relation to and over the solar heat absorbing sheet front side, controllable means for flowing a heat transport liquid in thermal contact with said solar heat absorbing sheet front side, controllable means for flowing air through the space between the solar heat absorbing sheet front side and the transparent cover and in thermal contact with the solar heat absorbing sheet front side means for selectively operating the controllable means for flowing a heat transport liquid and the controllable means for flowing air, whereby heat transport liquid along can be heated, or air alone can be heated for utilitarian purposes and to prevent overheating of the solar heat collecting panel, or warm air can be humidified by heat transport liquid.

14. In a dome shaped solar heated building having a dome shaped exterior wall, a plurality of frusto-sector shaped solar heat collecting panels comprising a solar heat collecting sheet and a spaced transparent cover, means for passing water over the solar heat collecting sheet in thermal contact therewith, air passage means for passing air in thermal contact with the solar heat collecting sheet between the solar heat collecting sheet and the transparent cover, means for opening and closing the air passage means, a common drain manifold connected to all the solar heat collecting panels and to a liquid heat storage reservoir for continuously maintaining the solar heat collecting panels in drained condition, means responsive to positive differential of temperature of the solar heat collecting sheets over the temperature of the heat storage reservoir for opening the means for passing water over the solar heat collecting sheets, means responsive to the absence of the positive differential of temperature of a solar heat collecting sheet over the temperature of the heat storage reservoir for closing the means for passing water over the solar heat collecting sheet, means responsive to the absence of the positive differential of temperature of the solar heat collecting sheet over the temperature of the heat storage reservoir and to a positive differential of temperature of the solar heat collecting sheet over the interior temperature of the building to open the means for passing air in thermal contact with the solar heat collecting sheet whereby the heat stored in the heat storage reservoir is conserved whenever heated air is available for space heating.

15. Solar heat conversion apparatus comprising a plurality of vertically inclined solar heat collectors supported in an azimuth arc, each of said solar heat collectors having a solar heat collecting sheet, valve means in series with a liquid source connected to admit liquid in thermal contact with each solar heat collecting sheet, a liquid heat storage reservoir, temperature sensing means in thermal contact with each of the solar heat collecting sheets and the liquid heat storage reservoir, means for comparing the temperature of the liquid heat storage reservoir, and for generating an electrical quantity in response to a positive differential of temperature of a solar heat collecting sheet over the temperature of the liquid heat reservoir, and means connecting such electrical quantity to the respective valve means to admit liquid to the respective solar heat collector.

16. A solar heat collector comprising a plurality of discrete solar heat collector panels supported to form a substantially arcuate wall, the convex side of which subtends an arc co-extensive, substantially with the path of the visable sun, a heat storage reservoir, said solar heat collector panels each having at least one solar heat collecting sheet, controllable valve means adapted to admit a heat transport fluid in thermal contact with each solar heat collector sheet and the heat storage reservoir; individual temperature responsive means in thermal coupling with at least one solar heat collecting sheet in each panel and temperature responsive means in contact with the heat storage reservoir, means responsive to a positive differential of temperature between each solar heat collecting sheet and the reservoir to open said controllable valve means; and duct means connected to all the solar heat collector panels and to the reservoir for transporting heated transport fluid from the heat collector panels to the heat storage reservoir.

17. A dual mode solar heat collector panel adapted to heat a heat transport liquid and air, comprising a solar heat collecting sheet, a substantial blanket of insulation directly adhered to the back of the heat collecting sheet, a transparent cover spacedly supported over and hermetically affixed to said solar heat collecting sheet on all edges thereof, controllable heat transport liquid inlet duct means penetrating said solar heat collecting sheet from the rear to the front thereof in a top portion thereof and adapted to admit a flow of heat transport liquid over said sheet, means for collecting heated transport liquid from proximate the bottom of said solar heat collecting sheet, controllable air duct means penetrating the solar heat collecting sheet above the heat transport liquid inlet duct means, air duct means connected to a lower portion of the solar heat collecting sheet adapted to admit unheated air into the space between the solar heat collecting sheet and the transparent cover, and, air duct valve switch means connected to the controllable air duct means to direct warmed air to a using device, or to dump the warmed air, if not needed, to the atmosphere to prevent excessive temperatures from damaging the solar heat collector panel, and whereby manipulation of the controllable heat transport inlet duct means and the controllable air duct means provides modes of operation which are: heating liquid, humidifying warmed air and heat dispersal.

* * * * *